United States Patent [19]

Erickson et al.

[11] 4,047,049

[45] Sept. 6, 1977

[54] DRIVE CIRCUIT WITH CONSTANT CURRENT OUTPUT

[75] Inventors: Fred William Erickson, Woodland Hills; Roy Hiroshi Nakahara, Sun Valley, both of Calif.

[73] Assignee: Litton Systems, Inc., Beverly Hills, Calif.

[21] Appl. No.: 626,250

[22] Filed: Oct. 28, 1975

[51] Int. Cl.$^2$ .......... H02J 9/02

[52] U.S. Cl. .......... 307/157; 315/169 TV

[58] Field of Search .......... 307/157, 40; 315/169 TV; 340/166 EL; 323/1, 4, 21, 80; 178/5.4 EL, 7.3 D; 328/183; 330/15

[56] References Cited

U.S. PATENT DOCUMENTS

| | | | |
|---|---|---|---|
| 3,740,570 | 6/1973 | Kaelin et al. | 307/40 |
| 3,754,181 | 8/1973 | Kreitz | 323/1 |
| 3,770,890 | 11/1973 | Winkler | 178/7.6 |
| 3,821,596 | 6/1974 | Leuck | 315/169 TV |
| 3,843,959 | 10/1974 | Owaki et al. | 178/7.3 D |
| 3,886,465 | 5/1975 | Mattfeld | 330/15 |

OTHER PUBLICATIONS

"Monolithic ICS Drive Plasma Displays" *Electronic Engineering,* Jan. 1974, p. 16.

*Primary Examiner*—David Smith, Jr.

*Attorney, Agent, or Firm*—Donald J. Ellingsberg

[57] ABSTRACT

A constant current drive circuit that can be driven directly from the output of a shift register which can find use, for example, as a constant current source for a light emitting diode (LED) to ensure uniform birghtness throughout a display surface that includes a plurality of LEDs.

10 Claims, 3 Drawing Figures

DRIVE CIRCUIT WITH CONSTANT CURRENT OUTPUT

BACKGROUND OF THE INVENTION

Electronic drive circuits have been developed and used, including drive circuits for light emitting diodes (LEDs); see U.S. Pat. No. 3,740,570 which was granted June 19, 1973, and assigned to the same assignee as the present invention. It is also known that the brightness of an LED is directly related to the electrical current level which energizes the LED. When hundreds of LEDs are used in a display surface, such as a calculator display or a display panel, or the like, the differing energizing currents between the several LEDs prevents a desired uniform brightness throughout the display surface.

OBJECTS OF THE INVENTION

Accordingly, it is an object of the invention to provide an electronic drive circuit with constant current output.

It is an object of the invention to provide a bistable electronic drive circuit with constant current output.

It is an object of the invention to provide a bistable electronic drive circuit with constant current output that is selectively determinable.

It is an object of the invention to provide an electronic drive circuit with constant current output for one or more LEDs.

It is an object of the invention to provide a bistable electronic drive circuit with constant current output, which is selectively determinable, for one or more LEDs to select and maintain a selected lumen output from the LEDs.

SUMMARY OF THE INVENTION

Briefly, in accordance with the invention, a new and improved electronic drive circuit with constant current output is provided having a primary electrical power supply supplying electrical energy at a first energy level output, a secondary electrical power supply responsive to the first level output supplying a selectively variable second energy level output, a resistor means in electrical series with the primary power supply and responsive to the first energy level output thereof, bistable control means responsive to the first energy level output through the resistor means and further responsive to the second energy level output thereby providing a third energy level output having a constant current determinable by the selectively variable second energy level output, and signal generating means selectively enabling and disabling the bistable control means so that the drive circuit can be selectively enabled and disabled.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
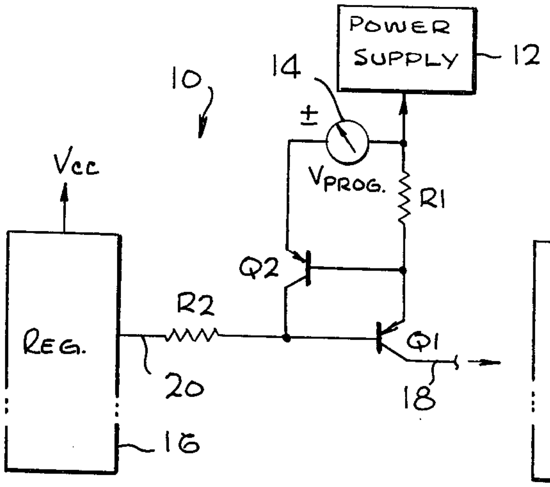
FIG. 1 is an electrical schematic of the electronic drive circuit of the invention.

Referring to FIG. 1, the electronic drive circuit 10 of the invention has a primary power supply 12 that provides an electrical energy input to the circuit. The electrical input from power supply 12 is connected through resistor R1 to the emitter of a current source transistor Q1. A secondary power supply 14 provides a selectively variable electrical energy input $V_{PROG}$ to the circuit; the secondary power supply is connected in electrical series with the primary power supply 12. The electrical input from the series connected primary power supply 12 and the secondary power supply 14 is connected to the emitter of a current regulating transistor Q2. The transistors Q1 and Q2, as individual triodes, are connected together as a bistable circuit with a base of transistor Q1 connected to the collector of transistor Q2, and the base of transistor Q2 connected to the emitter of transistor Q1. The base of transistor Q1 is connected through resistor R2 to a signal generator 16 which can be a conventional register such as a CMOS shift register. The collector of transistor Q1 is connected to an output lead 18 of the electronic drive circuit 10.

Operatively, a selectively variable and constant current output is supplied at output lead 18 by the electronic drive circuit 10 of the invention. The current supplied by the drive circuit 10 can be determined by the equation:

$$I \simeq I_{R1} = (V_{EB} + V_{PROG})/R1$$

Where:

- $I$ is the desired current (amperes) supplied by the drive circuit at output 18;
- $I_{R1}$ is the current (amperes) through resistor R1;
- $V_{PROG}$ is the voltage supplied by the selectively variable secondary power supply 14 (plus or minus volts);
- $V_{EB}$ is the enabling or cut-in voltage (volts) for the emitter-base junction of Q2; and
- $R1$ is the resistance (ohms) of R1.

The bistable state of the constant current output is controlled by the output level of the signal generator 16, e.g. a shift register. With a high output voltage at 20 (e.g. V=Vcc), both Q1 and Q2 are disabled or cut-off and there is no current output at 18. With a low output voltage at 20 (e.g. zero volts), Q1 draws a base current $I_B$ which turns on Q1 so that the resulting emitter-collector current $I_{EC}$ increases with a corresponding increase in the current through R1. The current $I_{EC}$ continues to increase until the current through R1 reaches a level where the corresponding voltage drop across R1 is equal to $V_{PROG} + V_{EB}$. When the voltage drop across R1 is equal to $V_{PROG} + V_{EB}$, Q2 draws a base current $I_B$ which turns on Q2. This holds or stabilizes the voltage across R1 that develops a constant current through R1 and through the emitter-collector junction of Q1 so that the current output at 18 is held constant. The current output at 18 can be selectively determined by adjusting the electrical energy input or input voltage $V_{PROG}$ of the secondary power supply 14 relative to the primary input voltage V of primary power supply 12. If $V_{PROG}$ is adjusted positive relative to V, the current output of the drive circuit 10 will decrease in value; if $V_{PROG}$ is adjusted negative relative to V, the current output will increase in value.

Figure 2:
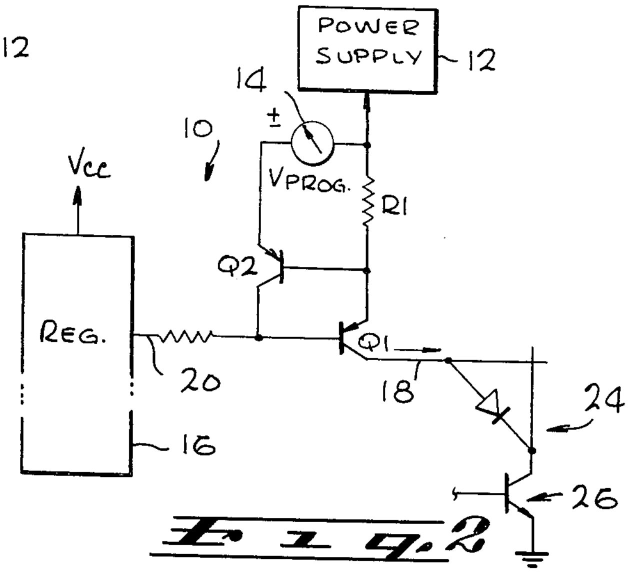
FIG. 2 is an electrical schematic of the drive circuit of FIG. 1 and a portion of an LED circuit which receives an output from the electronic drive circuit of the invention.

Referring to FIG. 2, wherein like parts in FIG. 1 are hereinafter identified by the same reference character, the electronic drive circuit 10 of the invention supplies a selectively variable and constant current output at lead 18, as described hereinbefore with reference to FIG. 1, to a driven device such as light emitting diode (LED) 24 which can be one of a plurality of LEDs arranged in a row-and-column display. The LED 24 is connected through transistor switch 26 to ground (see U.S. Pat. No. 3,740,570).

As an illustrative example, one electronic drive circuit 10 for an LED display that includes one or more LEDs such as LED 24 of FIG. 2 requires an output current I of 70ma at lead 18. If Q1 has a gain of 100, and output 20 is driven to zero potential by signal generator 16, then Q1 draws base current $I_{BQ1}$ at 2 ma. This turns on Q1 and the emitter-collector current $I_{EC}$ of Q1 starts to increase toward 200 ma. With R1 having a resistance of 10 ohms and Q2 having an emitter-base voltage drop of 0.7 volt, Q2 will draw base current $I_{BQ2}$. Thus turned on, the emitter-collector current $I_{EC}$ of Q2 will hold at 1.3 ma while $I_{BQ1}$ reduces from the initial 2 ma to 0.7 ma so that the current passing through R1 is held at 70 ma and similarly $I_{EC}$ of Q1 holds at the desired 70 ma. The electronic drive circuit 10 is turned off when the signal generator 16 returns the potential at output 20 to that of the power supply 12.

Figure 3:
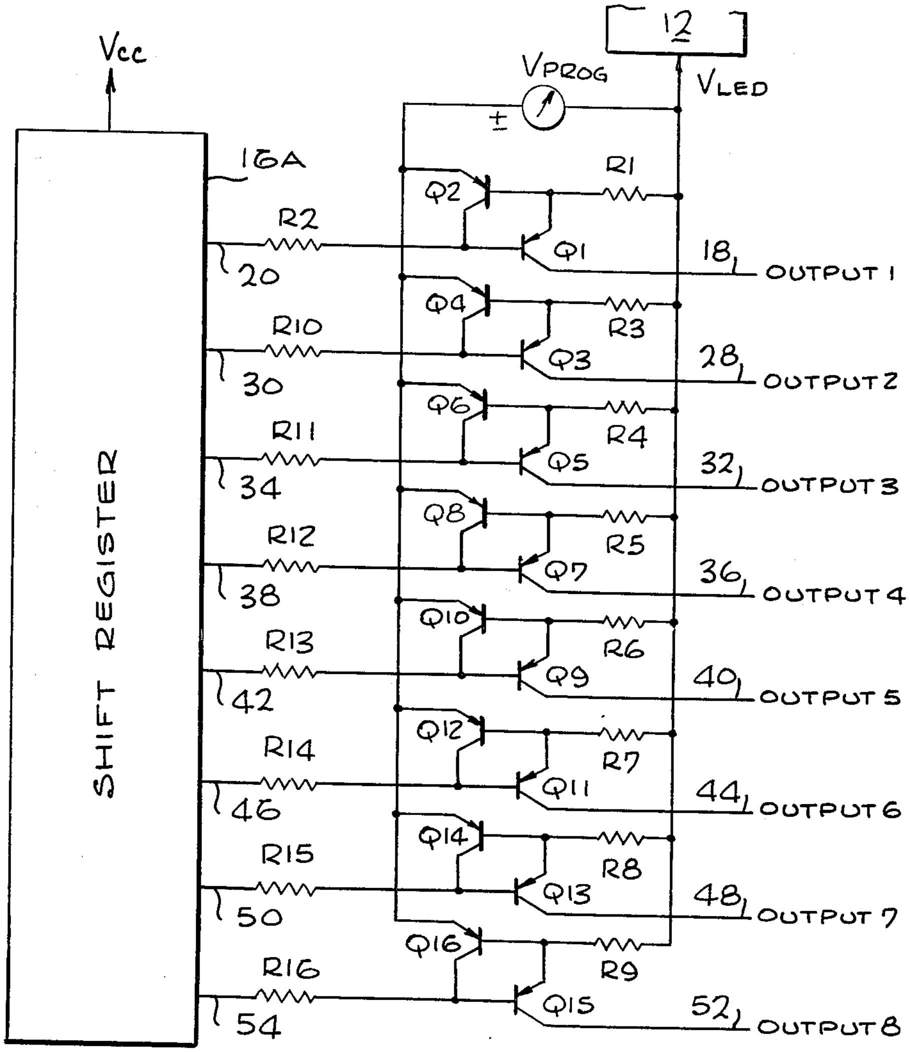
FIG. 3 is an electrical schematic of an LED display circuit wherein the electronic drive circuit of the invention finds use.

The electronic drive circuit 10 of the invention finds particular use in a display having a plurality of LEDs, such as that schematically shown by FIG. 3 wherein like parts in FIGS. 1 and 2 are hereinafter identified by the same reference character. A signal generator 16A, which can be a National Semiconductor 8-bit, serial-to-parallel CMOS shift register (Part No. MM54C164) drives eight independent electronic drive circuits consisting of bistable pairs of transistors Q1–Q2, Q3–Q4, Q5–Q6, Q7–Q8, Q9–Q10, Q11–Q12, Q13–Q14, and Q15–Q16 with respective odd-numbered ones of the paired transistors connected through respective resistors R1, R3, R4, R5, R6, R7, R8, and R9 to the primary power supply 12, and with respective even-numbered ones of the paired transistors connected through respective resistors R2, R10, R11, R12, R13, R14, R15, and R16 to the associated output leads 20, 30, 34, 38, 42, 46, 50, and 54 of signal generator 16A. The outputs 18, 28, 32, 36, 40, 44, 48, and 52 of the respective bistable pairs of transistors are electrically connected to one or more LEDs, such as LED 24 of FIG. 2 that can form a large screen, modular, flat panel LED matrix display (not shown) which requires a constant current source of all LEDs to ensure uniform brightness throughout the display surface regardless of ambient light conditions. Such LED displays heretofore have commonly experienced that the current through an individual LED will vary as a function of variations in the voltage drop across an LED row and/or column switch, variations in the voltage drop across the LED, and variations in the power supply; all result in a lack of constant brightness between LEDs in an LED matrix display.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:

1. A constant current drive circuit comprising:

a. first electrical energy source means supplying a first electrical energy level output, b. second electrical energy source means responsive to said first electrical energy level output and supplying a selectively variable second energy level output, c. a resistor connected in electrical series with said first electrical energy source means and responsive to said first electrical energy level output, d. bistable control means including triode means responsive to said first electrical energy level output through said resistor and to said second electrical energy level output, said bistable triode means providing a third electrical energy level output having a constant current determinable by said selectively variable second energy level output, and e. signal generating means selectively enabling and disabling said triode means so that the constant current drive circuit is selectively enabled and disabled.

2. The constant current drive circuit of claim 1 in which said bistable triode means includes a current source transistor and a current regulating transistor, said current source transistor having an emitter connected through said resistor to said first electrical energy source means and a collector as said third output, said current regulating transistor having an emitter-collector junction connected between the base of said current source transistor and said second electrical energy source means with the base of said current regulating transistor connected to the emitter of said current source transistor.

3. The constant current drive circuit of claim 1 in which said signal generating means is a shift register.

4. The constant current drive circuit of claim 1 in which said signal generating means includes a signal resistor connected in electrical series with the base of said current source transistor.

5. The constant current drive circuit of claim 1 in which said signal generating means includes a signal generating electrical energy source means supplying a selectively variable fourth electrical energy level output.

6. The constant current drive circuit of claim 5 in which said signal generating means selectively disables said triode means when said fourth electrical energy level output and said first electrical energy level output are substantially equal, and selectively enables said triode means when said fourth electrical energy level output is substantially less than said first electrical energy level output.

7. The constant current drive circuit of claim 2 in which said third electrical energy level output is determined by $$(V_{EB} + V_{PROG})/R1$$

Where $V_{EB}$ is the enabling voltage for the emitter-base junction of said current regulating transistor, $V_{PROG}$ is the voltage output of said selectively variable second energy level output, and $R1$ is the ohmic resistance of said resistor so that a voltage drop across said resistor equalling $V_{PROG} + V_{EB}$ enables said current regulating transistor thereby stabilizing the voltage drop across said resistor and concomitantly developing a constant current through said resistor as the desired component of said third electrical energy level output.

8. The constant current drive circuit of claim 1 which further comprises a driven device responsive to said third electrical energy level output supplying said constant current.

9. The constant current drive circuit of claim 8 in which said driven device is a light emitting diode.

10. The constant current drive circuit of claim 8 in which said driven device includes a plurality of light emitting diodes electrically connected in parallel.

* * * * *